United States Patent

[11] 3,526,209

[72] Inventors William W. Budge
 Hillsborough, California;
 George Walter Freeborn, Woodside,
 California
[21] Appl. No. 687,069
[22] Filed Nov. 30, 1967
[45] Patented Sept. 1, 1970
[73] Assignee Pacific Mariculture, Inc.
 Pescadero, California
 a corporation of California

[54] METHOD AND APPARATUS FOR GROWING FREE OYSTER SPAT
 21 Claims, 5 Drawing Figs.
[52] U.S. Cl. .................................................. 119/4
[51] Int. Cl. .......................................... A01k 61/00

[50] Field of Search .......................................... 119/4, 2

[56] References Cited
UNITED STATES PATENTS

| | | | |
|---|---|---|---|
| 463,397 | 11/1891 | Walton, Sr. .................. | 119/4 |
| 1,660,259 | 2/1928 | Elsworth ...................... | 119/4 |
| 2,302,336 | 11/1942 | Macdonald .................. | 119/2 |
| 3,196,833 | 7/1965 | Glancy ......................... | 119/4 |
| 3,316,881 | 5/1967 | Fischer ......................... | 119/4 |

Primary Examiner—Hugh R. Chamblee
Attorney—Flehr, Hohbach, Test, Albritton and Herbert ABSTRACT: Method and apparatus for growing free oyster spat by removing the spat from the cultch within a period less than thirty days after adherence to the cultch, and thereafter growing the spat free of a cultch.

Patented Sept. 1, 1970
3,526,209
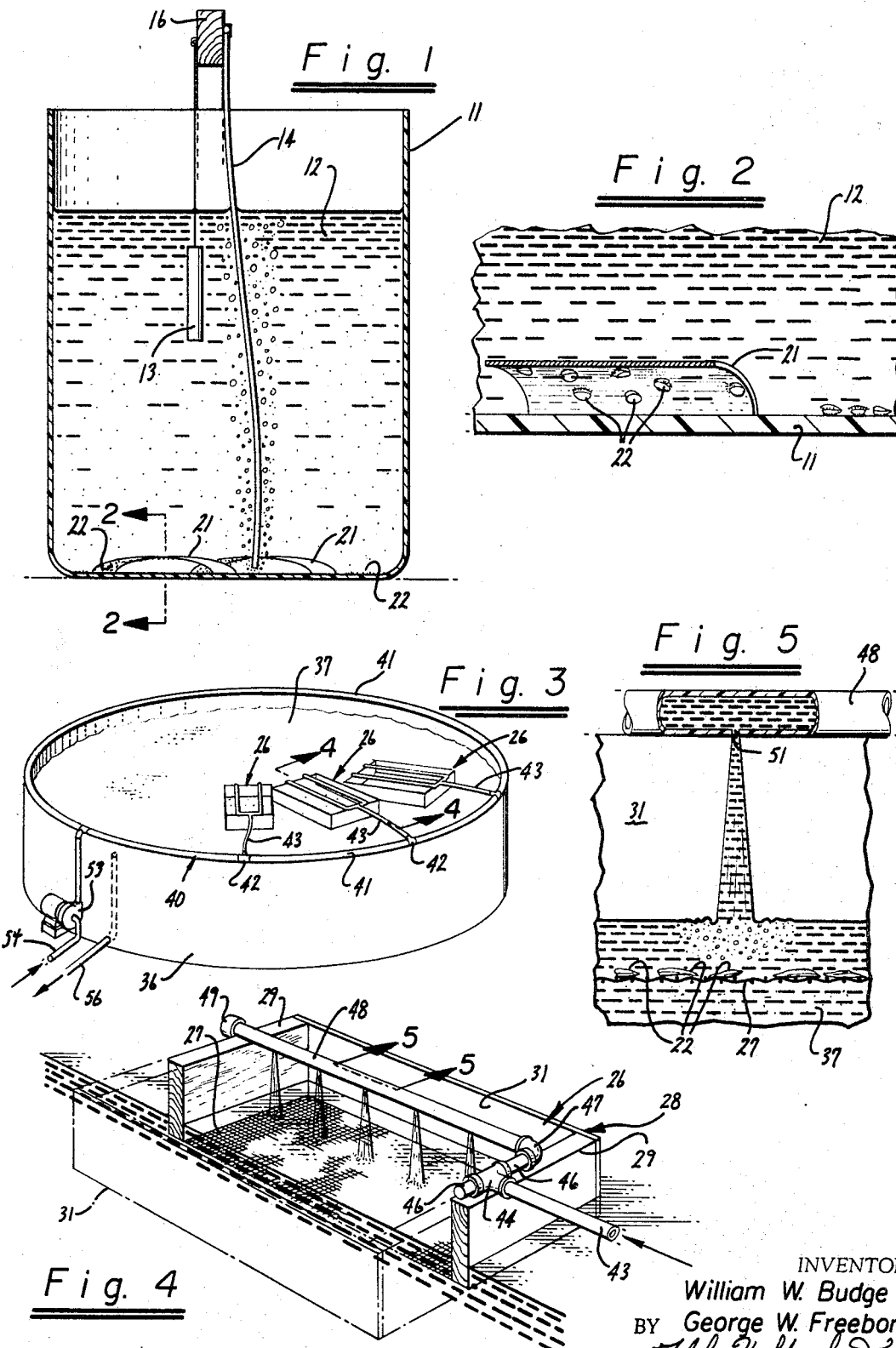
INVENTOR.
William W. Budge
BY George W. Freeborn
Attorneys 3,526,209

METHOD AND APPARATUS FOR GROWING FREE OYSTER SPAT

BACKGROUND OF THE INVENTION

This invention relates to the growing of oyster spat and more particularly to the growing of free oyster spat.

Heretofore in the growing of oyster spat, it has been necessary to provide cultch material for the oyster larvae to set upon when it passed through metamorphosis. Many different types of cultch material have been utilized, such as cleaned oyster shells. Other materials have also been used such as tile and plastic rope. When utilizing such cultch materials, it often has been the practice to let the oysters grow to maturity on the cultch and then to harvest them. In all cases, it has been thought necessary to leave the oyster spat on the cultch material until the oyster spat had attained an age ranging from 6 to 12 months and which had a size ranging from 1 inch to 2-—3 inches. This had been thought to be necessary so that the oysters would be sufficiently durable to withstand removal from the cultch material and to survive free of the cultch material.

The utilization of such cultch materials for the growing of spat has posed many problems for commercial oyster hatcheries. For example, it is necessary to acquire large quantities of the cultch material which, if it is oyster shell, must be properly cleaned and then drilled with holes so that it can be placed on strings to permit handling of the same in groups. After the larvae have set upon the cultch material, it is necessary to grow the oyster spat on the cultch material so it has an age ranging from 6 weeks to 10 weeks and has a size ranging from 3 millimeters to 1 centimeter so that it can be shipped to an oyster grower. In the past, it has been necessary for the oyster grower to transport the spat secured to the cultch material and to further grow the spat until it reaches an age ranging from 6 to 12 months and having a size ranging from 1 inch to 2—3 inches so that the grower could remove the same from the cultch material and plant the oysters in oyster beds. From the foregoing, it can be seen that there is a considerable expense in the handling and transportation of the cultch material which adds substantially to the cost of growing oysters. There is, therefore, a need for a new and improved method and apparatus for growing of oyster spat.

SUMMARY OF THE INVENTION AND OBJECTS

The method for growing free oyster spat comprises growing oyster larvae in a free swimming state in a vessel, causing oyster larvae to set upon a relatively smooth surface when the larvae pass through metamorphosis to become oyster spat. The oyster spat is removed from the surface to which it has adhered within a period of less than thirty days from when it has set on the surface, and preferably when the oysters have a size which is less than one centimeter.

In general, it is an object of the present invention to provide a method and apparatus for growing free oyster spat which permits the oyster spat to be removed within thirty days after the oyster has set on a surface and when it has a size less than one centimeter.

Another object of the invention is to provide a method of the above character which makes it possible to ship spat very inexpensively and over long distances.

Additional objects and features of the invention will appear from the following description in conjunction with the preferred embodiment of the invention in conjunction with the accompanying drawing.

DESCRIPTION OF THE DRAWINGS

FIG. 1 is a cross-sectional view of a tub utilized for growing oyster larvae.

FIG. 2 is a cross-sectional view taken along the line 2—2 of FIG. 1.

FIG. 3 is an isometric view of a large tank with trays therein for the growing of spat.

FIG. 4 is a cross-sectional view taken along the line 4—4 of FIG. 3.

FIG. 5 is a cross-sectional view taken along the line 5—5 of FIG. 4.

DESCRIPTION OF PREFERRED METHOD AND APPARATUS

In practicing the present method for the growing of free oyster spat, the oyster larvae is produced by techniques which are conventional in commercial oyster hatcheries. In accordance with such conventional practices, male and female oysters are induced to spawn by immersing them in warm sea water ranging in temperature from 20 to 32°C. The eggs discharged range typically from 45 to 60 microns with the majority measuring between 50 and 55 microns. The fertilized eggs are kept in sea water having a temperature approximately 25°C. and as cleavage progresses, the embryo gradually develops into a swimming ciliated larva and reaches the trochophore stage within 12 to 16 hours. Late in the trochophore stage, the shell gland begins to secrete the shell and when the shell completely encloses the soft parts, the larva has reached the early straight-hinge stage. This also may be called the shelled-veliger stage. The smallest normal straight-hinge larvae measure approximately 68 x 55 microns. Within 48 hours, at a temperature of approximately 25°C. in sea water, the larvae measure approximately 75 x 67 microns. At this stage, they begin to take in particulate food.

The larvae are highly active and remain in suspension in the sea water throughout the free swimming period. The larvae metamorphose when they are between 275 and 315 microns in length, but occasionally free swimming larvae may be of a greater size. The larvae are normally grown to metamorphoses in sea water at temperatures ranging from approximately 17 to 33°C.

In accordance with the present invention, the larvae are grown in sea water in plastic tubs 11 formed of polyethylene in which sea water 12 is maintained at the desired temperature of approximately 25°C. by the use of thermostatically controlled electrical immersion heaters 13. The sea water in the tubs 11 is aerated with air through a tube 14 extending downwardly into the sea water and supported from a support member 16.

Prior to the time the larvae reach metamorphoses, sheets 21 of a material, which can be bent but which will retain its shape, are placed in the sea water to provide surfaces to which the oyster larvae can attach at the end of the free swimming stage to become the oyster seed or spat 22. One material found to be particularly suitable is lead. By way of example, thin sheets of lead approximately 3 inches wide, 9 inches long, and approximately 1/32 inch in thickness were utilized. It is desirable that the material have a relatively smooth surface so that the oyster spat can be removed readily as hereinafter described.

It has been found that the oyster larvae have a great affinity for the lead and readily set on the lead sheets. Other materials have been tried with less success. For example, polyethylene, polyvinyl, chloride, Teflon and nylon sheets have been tried. The oyster larvae do set on these sheets but not as readily. However, it has been found that if polyethylene sheets are aged for several years in sodium hypochlorite to, in effect, provide slightly roughened surfaces, the polyethylene sheets do provide a relatively attractive surface for the larvae and will interest the larvae in setting on the same. Pewter and silver sheets have also been tried with a lesser degree of success. Other materials could be utilized; however, they have disadvantages. For example, iron has a tendency to corrode which causes discoloration of the water and is harmful to the oyster larvae. Galvanized steel has also been found to be harmful to young oyster spat.

In general, in accordance with the present invention, it has been found desirable to provide surfaces which are relatively smooth to which the oyster larvae can attach when they are setting. The use of separate sheets 21 of material placed within the tubs 11 has the advantage in that the sheets can be readily removed for removal of the spat as hereinafter described. In practice, it has been found that the spat has a tendency to set on the underside of the bent sheet as indicated particularly in FIG. 1 of the drawings. In order to encourage the larvae to also set on the other side of the sheet of material, it has been found that after larvae have first set on one side, the sheet of material can be removed and then bent so that the other side is concave and then again replaced within the tub. It has been found that the larvae then will readily set on the other side of the sheet. It also has been found that at the time the larvae is setting on the sheets 21 within the tub, substantial quantities of the larvae will actually set on the tub itself and principally upon the inner side of the bottom wall of the tub although a few larvae will even set upon the inner surfaces of the side walls of the tub.

The larvae grown in the tub are generally of the same age and also will pass through metamorphosis and set within a twenty-four hour period and certainly within a forty-eight hour period.

The spat are removed from the surfaces on which they have set after the spat have had an opportunity to grow after being set for a period of at least twelve hours and preferably for a period of at least twenty-four hours. The spat should not be allowed to remain set for a period greater than thirty days before removal because thereafter removal is very difficult and may destroy the oyster. The spat, upon removal, have a size which is preferably from 300 to 500 microns and less than one centimeter in the major dimension. In practice, we have found it desirable to remove the oyster spat from the sheets of material within one to five days and having a size ranging from 300 to 500 microns. It has been found to be possible to produce free live spat with almost 100 percent survival by removing the oyster spat from the surface to which it has adhered after it has been set for twenty-four hours and in which the individual oyster seed has a size of approximately 300 microns.

Several methods have been utilized to remove the oyster spat in accordance with the present invention without damaging substantial quantities of the oyster spat. One method which has been found to be particularly desirable is to utilize a brush having soft bristles and brushing the oyster spat into specially prepared trays 26. For example, when a lead sheet is used, the oyster spat can be first brushed off one side of the sheet, and then the sheet can be bent in the opposite direction and the oyster spat removed by brushing the other side.

The oyster spat can be removed from the side walls of the tub 11 and also from the bottom wall of the tub by the use of a brush after the sea water 12 has been removed from the tub.

It also has been found that it is possible to remove the oyster spat by utilizing a very small jet of water under high pressure and bending the sheet as the jet of water is applied to the sheet to cause the oyster spat to be removed therefrom.

By providing the oyster larvae with a surface which is relatively smooth, it is difficult for the oyster to adhere too strongly to the sheet of material and, therefore, it is relatively easy to remove the oyster without damaging the oyster. Also, because of this fact, it is possible to use a soft rag or a sponge to remove the small oysters from the sheets of material.

Upon removal of the oyster spat from the sheets of material, the oyster spat are put back into tubs of sea water and are grown under conditions which would favor the growth of larvae. Since the spat are heavier than sea water and no longer have means of propulsion they sink to the bottom of the tub. At least once a day the spat lying in the bottom of the tub are moved about with a soft brush. This discourages reattachment of the spat. The spat are grown in this manner for several days until they will not pass through a screen which has square openings which are approximately 370 microns on a side. Spat that are defective or which were damaged in removal from the sheet surface will never attain the size required to hold on this screen and are thus eliminated from the batch.

When the spat attain sufficient size to hold on the 370 micron screen they are removed from the tubs and placed upon a very fine mesh screen 27 which forms the bottom wall of the tray 26. The screen has openings which are only slightly less in size than the size of the oyster spat. Thus, it has been desirable to provide a fine mesh screen which has square openings which are approximately 333 microns in size. The screen is preferably formed of a material for which the oyster does not have a particular affinity to thereby discourage the oysters from setting on the screen. One material found particularly satisfactory is a fine nylon mesh screen. The screen 27 is secured to the bottom sides of a rectangular wooden framework 28 formed by a pair of spaced parallel end members 29 and a pair of spaced parallel side members 31 which are fastened together in a conventional manner. The tray has a depth of approximately six inches and a width of approximately 24 inches and a length of 36 inches.

As soon as a sufficient quantity of oyster spat has been placed in the tray, the tray is immediately placed in a large tank 36 carrying sea water 37 which is retained at the desired temperature, as for example 25°C., for growing oysters. The trays are floated on top of the sea water and the weight of the tray itself is sufficient to cause the screen 27 carried by the tray to be disposed below the surface of the water by a suitable distance, as for example one-half inch, so that the oyster spat carried on the top surface of the screen are disposed below the surface of the sea water as shown particularly in FIGS. 4 and 5.

Means is provided for cleaning the trays during the time the oyster spat are growing therein and also for providing food to the young oysters in the trays and consists of a piping system 40 formed of a suitable material, such as plastic, which includes a circular pipe 41 which extends around the circumference of the tank 36 and is secured to the top edge thereof. The pipe 41 is provided with a plurality of T's 42 which are connected to lines 43. Lines 43 are connected to T's 44 (FIG. 4). T's 44 are connected to laterals 46 which feed into elbows 47 connected to a pair of spaced parallel feeder lines 48 that extend longitudinally of the tray 26 and overlies the tray. The ends of the feeder lines are closed by caps 49. The feeder lines 48 are provided with a plurality of longitudinally small holes 51 in the bottom sides of the line to permit the sea water carried by the piping 41 to rain down upon the oyster spat within the trays 26.

The sea water supply to the piping system 40 is supplied through a motor driven pump 53 which is connected to a pipe 54 that leads to a heater (not shown), and a filter (not shown) for treating the water which is withdrawn from a line 56 at the bottom of the tank 36 for recirculation. Means (not shown) is also provided for periodically introducing food of the type required by the oyster spat into the sea water in piping 40 before it is supplied to the pump 53.

It has been found that raining the sea water down upon the oyster larvae within the trays 26 is particularly beneficial. It has been found that raining the water down upon the screen flushes the detritus and other waste material away from the animals or oysters and keeps the oyster spat free and clear of any foreign material to provide the best possible environment for the growth of the oyster spat. The water which is rained down upon the oyster spat is maintained at the desired temperature for growing of the oyster spat, as for example 25° C. The materials which are flushed through the trays go to the bottom of the tank 36 and are moved from the tank and filtered therefrom before the recirculated water is again rained down upon the spat.

The small mesh screen which is provided in trays 26 as the water rains down upon the same provides an excellent environment for the growth of the spat and at the same time discourages the spat from re-attaching themselves. Because the screen is provided, there is much less likelihood of the spat re-attaching to the screen. Re-attachment is also discouraged by motion caused by the sea water raining down upon the spat.

The spat is grown to the desired size within the trays 26. Preferably, the growers who grow oysters wish to receive the oysters at a size which is greater than 6 mm, for example 8- —15 mm. With the present method, oyster spat can be grown to this size within one to two months. If desired, the oysters can be grown to a larger size, as for example 3 cm., if desired, by the grower.

In growing young oysters to larger sizes, it may be desirable to use trays such as trays 26 having a screen with larger openings therein. For example, at an intermediate stage when the oysters are larger than 2 mm., it would be desirable to remove the spat from the trays 26 shown in FIGS. 4 and 5 and to provide trays having screens with the larger mesh. This is desirable because it provides less surface for the oysters to re-attach themselves and encourages the oysters to remain free so that they can be readily removed from the trays and shipped to the growers.

By the use of the foregoing method and apparatus, it has been possible to provide free growing oysters at a very early age which heretofore was thought to be impossible. Since the oysters are free growing, they are relatively easy to ship because there is no necessity to provide cultch material or to ship cultch material with the oysters. This makes it feasible to transport spat by air throughout the United States of America and, in fact, throughout the world from a single location.

It has been found that free oyster spat prepared in the manner described above is as capable of adapting to the environments in which it is placed to grow into mature oysters as the spat which has previously been grown on cultch material. In addition, it has been found that the spat which is grown with the present method is more desirable because the spat is removed from the surface to which it has attached while very young. For this reason, the spat is all of substantially uniform size and has not modified its shape in order to conform to the cultch material on which it normally grows. Also, it has not been distorted by growth of neighboring spat growing on the same piece of cultch material. Thus, by use of the free oyster spat, it is possible to provide a more uniform and more desirable commercial oyster.

It is apparent from the foregoing that there has been provided a new and improved method and apparatus for the growing of oyster spat which has very significant commercial aspects particularly in that it now makes possible the shipping of oyster spat by air to remote locations at relatively low cost. The method and apparatus also makes it possible to grow the oysters more rapidly so that they can be shipped to growers within a shorter period of time.

We claim:

1. In a method for growing oyster spat, growing oyster larvae in a free swimming state in a container having therein a body of water which is in contact solely with said container and a cultch material, said cultch material having only relatively smooth surfaces for which oyster larvae will have an affinity when they pass through metamorphosis, permitting the oyster larvae to set primarily on said cultch material having a relatively smooth surface as the oyster larvae pass through metamorphosis to become oyster spat, and removing substantially all the oyster spat from the relatively smooth surface of the cultch material after the oyster spat has set for a time which is less than thirty days.

2. A method as in claim 1 wherein the oyster spat is removed in a period ranging from 1 to 5 days after it has set and having a size ranging from 300 microns to 5 millimeters.

3. A method as in claim 1 wherein the cultch material includes sheets of flexible material disposed in the body of water.

4. A method as in claim 1 wherein the oyster spat is removed by the use of a stream of water impinging upon the surface of the cultch material.

5. A method as in claim 3 wherein the sheets of cultch material are flexed to facilitate removal of the spat.

6. A method as in claim 1 wherein the cultch material includes sheets of lead.

7. A method as in claim 1 wherein said oyster spat is removed when it has a size which is less than 2 millimeters.

8. A method as in claim 1 wherein said oyster spat is removed when it has a size ranging from 300 microns to one centimeter.

9. A method as in claim 1 together with the step of placing the oyster spat on a relatively fine mesh screen and raining sea water down upon the oyster spat while it is on the screen.

10. A method as in claim 9 wherein the screen forms the bottom wall of a tray having upwardly extending side walls together with the step of positioning the tray in a tank of water so that the screen is below the surface of the water and the spat is covered by the water in the tank and the upper extremities of the tray are above the surface of the water to prevent the loss of the oyster spat from the tray.

11. A method as in claim 9 together with the step of supplying food to the oyster spat by supplying it in the water being rained down upon the spat.

12. A method as in claim 9 wherein the screen which has a mesh in which the openings therein are only slightly smaller than the size of the oyster spat to discourage the oyster spat from adhering to the screen.

13. In apparatus for growing oyster spat, a tub formed of material which is resistant to attack by sea water, a quantity of sea water disposed in the tub, means for retaining the sea water at a predetermined temperature, said tub being free of any material which does not have a relatively smooth surface and being formed of a material having a relatively smooth inner surface and a removable cultch material within said tub having only relatively smooth surfaces which will attract the setting of oyster larvae thereon.

14. Apparatus as in claim 13 wherein said cultch material is polyethylene.

15. Apparatus as in claim 13 wherein said cultch material is a metal which can be bent and will retain its shape within the sea water.

16. Apparatus as in claim 15 wherein said cultch material is lead.

17. In an apparatus for growing oyster spat, a tank formed of material resistant to attack by sea water, a quantity of sea water within the tank, at least one tray disposed in the tank, said tray being formed of a framework which floats in the water and having an open top side and an open bottom bottom side, a fine mesh screen carried by said framework and covering said bottom side of the framework, said tray being free of cultch material and being positioned in the sea water so that its open side faces upwardly with the screen being immersed in the water at a level which is below the surface of the water so that oyster spat carried on the screen are disposed below the surface of the water and with the framework extending above the surface of the water to retain the oyster spat on the screen.

18. Apparatus as in claim 17 together with means for raining water down upon the screen.

19. Apparatus as in claim 18 wherein said means for raining water down upon the screen comprises plastic piping having a plurality of openings therein, said plastic piping overlying the tray and resting upon the tray.

20. Apparatus as in claim 17 wherein a plurality of trays are floating within said tank and wherein said piping includes means for raining down sea water on the screens of each of said trays.

21. In a method for growing oyster spat, growing oyster larvae in a free swimming state in a container having a body of water in contact solely with said container and a cultch material, said cultch material having only relatively smooth surfaces for which oyster larvae will have an affinity when they pass through metamorphosis, permitting said oyster larvae to remain in said body of water until the oyster larvae pass through metamorphosis to thereby permit the oyster larvae to set upon said relatively smooth surfaces of said cultch material to become oyster spat, removing substantially all of the oyster spat from the surfaces of said cultch material within a period of time which is less than thirty days after the oyster spat has set, and placing the removed oyster spat in a separate body of water in an environment in which the oyster spat will be separate from each other so that they can be shifted independent of each other to permit their ready shipment to other locations.